Dec. 20, 1955  J. P. O'MEARA  2,727,634
FILTER
Filed Dec. 15, 1952
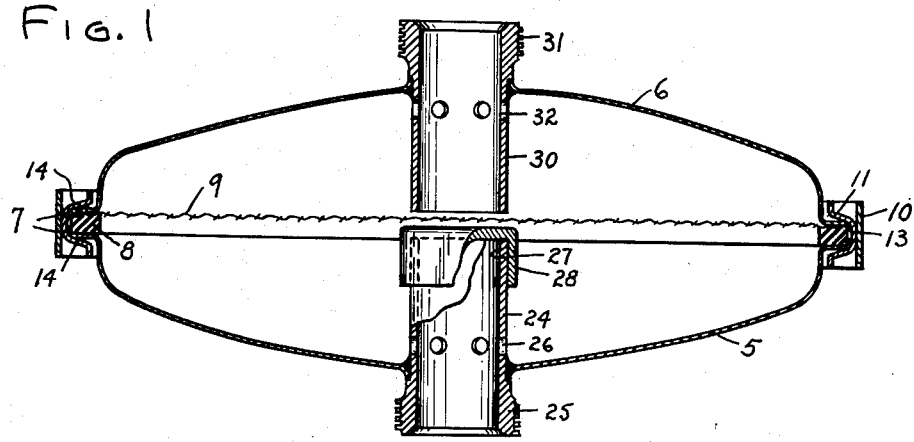
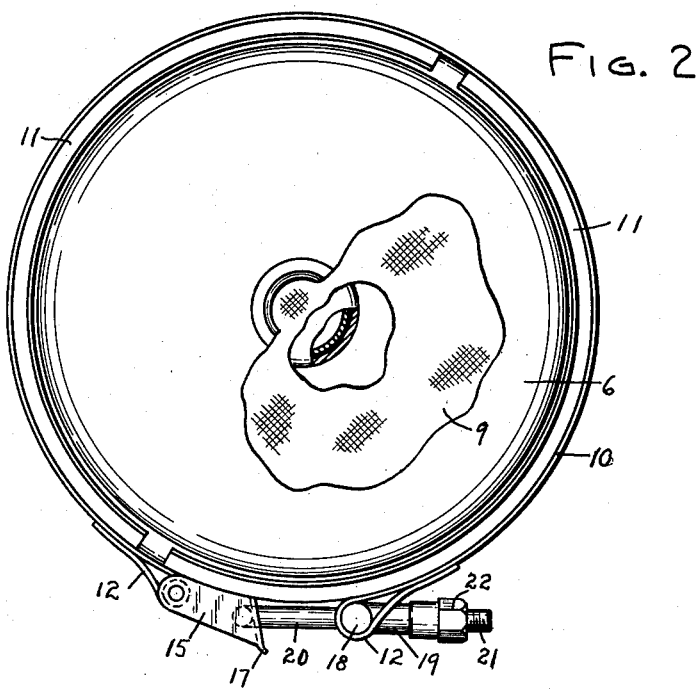
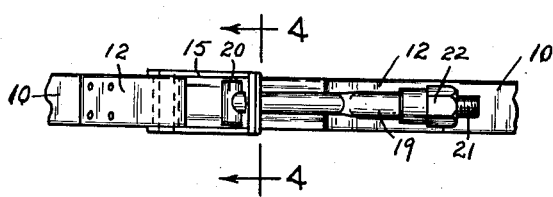
INVENTOR.
James P. O'Meara
BY Quarles & French
Att'ys.

United States Patent Office 2,727,634
Patented Dec. 20, 1955

2,727,634
FILTER

James P. O'Meara, Milwaukee, Wis., assignor to W. M. Sprinkman Corporation, Milwaukee, Wis., a corporation of Wisconsin Application December 15, 1952, Serial No. 326,086

1 Claim. (Cl. 210—164)

The invention relates to filters.

The present trend in the farm handling of milk for herds of any size is to filter the milk and store it in large shipping containers. Where the farmer has a herd of forty to fifty cattle or less, the usual milk filters such as used by the milk distributors are too complicated and expensive for his use. The object of the present invention is to provide a simple and relatively inexpensive filter for use on the farm, in the line between the milking machine and the milk storage receptacle and including a single filter element.

The invention further consists in the several features hereinafter described and more particularly defined by the claim at the conclusion hereof.

In the drawings:

Fig. 1 is a vertical sectional view through a filter embodying the invention, certain of the interior parts being shown in full;

Fig. 2 is a plan view with parts broken away;

Fig. 3 is a side elevation view of part of the band clamp;

Fig. 4 is a detailed vertical sectional view taken on the line 4—4 of Fig. 3.

Referring to the drawings, the filter includes complementary housing sections 5 and 6, each having juxtaposed cylindrical edge flanges 7 receiving between them a sealing ring 8 of rubber or other suitable material and the peripheral edge of a single filter pad 9 between them. The pad 9 is of the type used for filtering milk and similar solutions and is, therefore, capable of flexing under pressure of the solution being filtered.

The sections 5 and 6, ring 8, and pad 9 are clamped together by any suitable form of ring clamp which will draw the flanges 7 down into fluid-tight clamping engagement with the ring 8 and pad 9.

I have shown a known form of ring clamp comprising an outside band 10 to which half circle bands 11 are secured in spaced relation so that when the looped ends 12 of the band 10 are pulled toward each other, the band portions 11 will be pulled toward each other to clamp parts held between them. In the present instance each band portion 11 has a flat 13 and tapered flanges or sides 14 which engage the flanged portions 7 of the sections 5 and 6 and draw these sections toward each other when the portions 11 are moved toward each other. One of the looped ends 12 of the band 10 has a special stirrup fitting 15 pivotally connected thereto at one end and provided with a slot 16 at its other end and a finger projection 17. The other looped end of the band 10 has the pin ends 18 of a bolt socket 19 mounted therein. A T-headed bolt 20 has its threaded shank 21 mounted in the socket 19 and carrying a tension or clamping pressure adjusting nut 22. The T-head of the bolt 20 engages the back of the front end of the stirrup fitting 15 when the clamp is in clamping position, and this engagement is made possible by the passage of the head end of the shank 21 into the slot 16. After the bolt is coupled to the fitting 15, the nut 22 is tightened up on the bolt 20 to draw the clamp into firm engagement with the parts to be clamped.

The lower housing section 5 is preferably the inlet section to permit any sediment in the incoming milk to collect by gravity on its bottom. This section has a centrally disposed tube 24 secured to it by welding. The tube 24 has an exteriorly disposed portion 25 threaded to take the coupling nut of a union coupling in the milk discharge line and within the section is provided with flow holes 26 adjacent the bottom of the housing and is covered at its open upper end 27 by a loosely fitting cap 28. The cap prevents free upward flow of the milk and diverts this flow through the holes 26 so that the pressure on the entire area of the pad is equalized. The central portion of the filter pad 9 overlies the top of the cap 28 which under the pressure of milk passing through the filter may move up against the pad 9. Other forms of connections between the cap and the tube 24 may be used without departing from the invention.

The upper housing section 6 is preferably the outlet section and has a centrally disposed tube 30 secured to it by welding. The tube 30 has an exteriorly disposed portion 31 threaded to take the coupling nut of a union coupling in the milk discharge line and within the section is provided with flow holes 32 adjacent the top of the housing. The tube 31 extends down into the upper housing to a position within a short distance of the cap 28, but it may be engaged by the filter pad 9 when the cap 28 pushes upwardly on it and the tube 31 then acts to limit the upward bellying of this pad under the pressure of the milk passing through the filter. The clearance between the pad 9 and the lower end of tube 30 may be as much as one-sixteenth of an inch.

The housing sections including their tubes and the cap 28 are made of stainless steel and may be easily cleaned to keep them in a sterile condition.

I desire it to be understood that this invention is not to be limited to any particular form or arrangement of parts except in so far as such limitations are included in the claim.

What I claim as my invention is:

In a filter of the type described, the combination of a flexible filter pad, a marginal sealing packing, a pair of complementary housing sections having base portions adapted to receive and clamp between them the peripheral portion of said filter pad and said marginal sealing packing, means for drawing said sections toward each other to effect the aforesaid clamping action, each section having a centrally disposed tube extending into it to within a short distance of each other and the interposed pad but permitting free passage of the central portion of the pad between their inner ends and movement relative thereto while limiting the amount of flexing of the interposed pad, said pad between its peripheral and central portions being entirely unsupported and free to flex toward either of the walls of the housing section, each tube having an exteriorly disposed pipe connecting end and provided adjacent the wall of its housing section with flow openings, the tube at the inlet end of the housing having a cap loosely mounted thereon to block off free flow through the inner end thereof and being movable upwardly under the pressure of the liquid being filtered to bring the central portion of the filtering pad into engagement with the inner end of the tube at the outlet end.

References Cited in the file of this patent

UNITED STATES PATENTS

| 182,638 | Brach | Sept. 26, 1876 |
| 766,918 | Tousey | Aug. 9, 1904 |
| 1,172,938 | Buxton et al. | Feb. 22, 1916 |
| 1,749,730 | Kenney | Mar. 4, 1930 |
| 2,011,031 | Birch | Aug. 13, 1935 |
| 2,341,414 | Polivra | Feb. 8, 1944 |
| 2,584,206 | Hodsdon | Feb. 5, 1952 |
| 2,628,721 | Mathews | Feb. 17, 1953 |
| 2,665,009 | Harstick | Jan. 5, 1954 |

FOREIGN PATENTS

| 98,389 | Germany | Feb. 19, 1895 |
| 663,858 | France | Aug. 27, 1929 |